Kelley & Kingsley,
Bed Bottom,
N° 82,960. Patented Oct. 13, 1868.

Witnesses
A. B. Jordan
Josiah L. Hawkins

Inventors
J. B. Kelley
N. P. Kingsley

United States Patent Office.

J. B. KELLEY AND N. P. KINGSLEY, OF BRANDON, VERMONT.

*Letters Patent No. 82,960, dated October 13, 1868.*

IMPROVED SPRING-BED BOTTOM.

The Schedule referred to in these Letters Patent and making part of the same.

*To all whom it may concern:*

Be it known that we, J. B. KELLEY and N. P. KINGSLEY, both of Brandon, county of Rutland, and State of Vermont, have invented certain new and useful Improvements in Bed-Bottoms; and we do hereby declare that the following is a full, clear, and exact description of the same, reference being had to the accompanying drawings, and to the letters of reference marked thereon.

Figure 4:
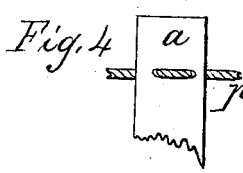
Figure 3:
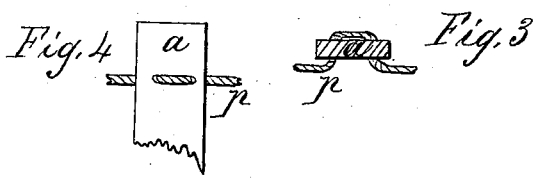

Figures 3 and 4 enlarged views, showing the manner of passing the rope through the slats.

This invention consists in the arrangement and combination of the cross-springs and device for adjusting the longitudinal springs or slats, as hereinafter set forth.

The springs $c\ c'\ c''$ are composed of three pieces of wood placed crosswise of the bedstead, and at each end thereof, the whole resting upon the blocks or projections $d\ d$ attached to the bedstead.

The two lower springs $c'\ c''$ are fastened together in the middle by the clamp-screw $s$, with the two blocks B B placed between them at proper distances from the centre.

The upper spring $c'$ supports the top spring $c$, which rests upon the blocks $b\ b$. The longitudinal springs or slats $a\ a\ a$ rest upon the top spring $c$, and are held in place by the adjusting-ropes $p\ p$. This rope passes through two holes in each end of the slats, as shown more plainly in figs. 3 and 4, so that the slats may be adjusted at any desired distance apart; as in the case of two persons of different weight occupying the same bed, the slats may be adapted to each person's weight by simply moving them further apart or nearer together, the rope keeping the slats in place, and each slat working independently of the rest.

Figure 1:
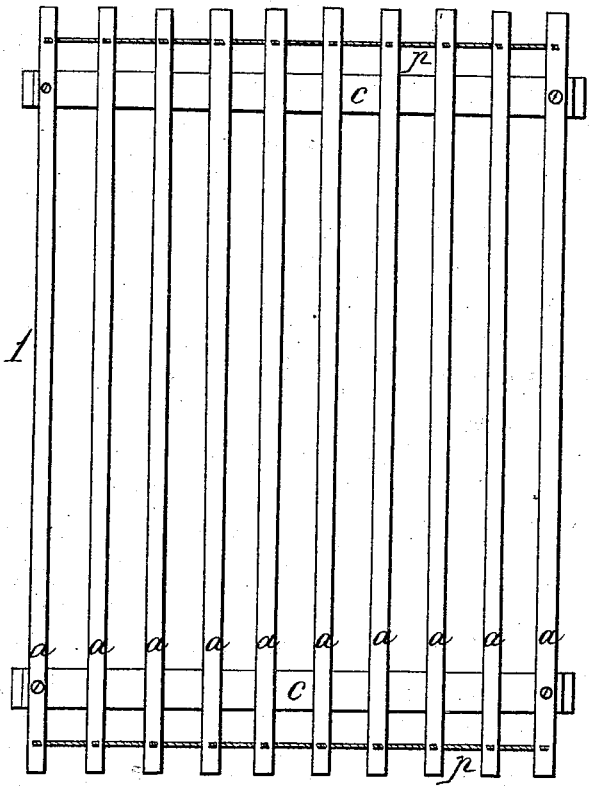
Figure 1 is a top view, showing the arrangement of the slats and position of cross-pieces supporting the same; also the manner of passing the ropes through the ends of the slats.
Figure 2:
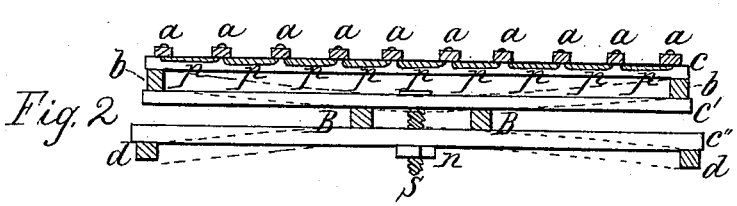
Figure 2 is an end view.

The object of the clamp-screw $s$ is to increase or diminish the rigidity of the two lower springs $c'\ c''$. These two springs being placed in a horizontal position, parallel to each other, may be strengthened or stiffened by screwing up the nut $n$, when they will assume the arched position indicated in fig. 2 by the dotted lines. This is a very simple and effectual method of adjusting the whole bed-bottom to different weights.

It will be readily seen that this arrangement of springs and slats furnishes a very easy and elastic bed-bottom, which is easily adjusted, simple in construction, cheap, and serviceable.

What we claim as our invention, and desire to secure by Letters Patent, is—

1. The combination and arrangement of the springs $c'\ c''$, blocks B B, and clamp-screw $s$, substantially as and for the purposes set forth.

2. The arrangement and combination of the springs $c'\ c''$, blocks B B, and clamp-screw $s$, with the spring $c$, blocks $b\ b$, and slats $a\ a\ a$, substantially as and for the purposes set forth.

J. B. KELLEY.
N. P. KINGSLEY.

Witnesses.
JOSIAH Q. HAWKINS,
A. B. JORDON.